United States Patent [19]

Ackland et al.

[11] 4,384,273

[45] May 17, 1983

[54] TIME WARP SIGNAL RECOGNITION PROCESSOR FOR MATCHING SIGNAL PATTERNS

[75] Inventors: Bryan D. Ackland, East Windsor; David J. Burr, Tinton Falls; Neil H. E. Weste, Eatontown, all of N.J.

[73] Assignee: Bell Telephone Laboratories, Incorporated, Murray Hill, N.J.

[21] Appl. No.: 245,952

[22] Filed: Mar. 20, 1981

[51] Int. Cl.³ .......................... G06K 9/64; G10L 1/00
[52] U.S. Cl. ................................... 382/34; 179/1 SD; 364/513; 364/900; 382/27; 382/42; 382/68
[58] Field of Search ... 364/200 MS File, 900 MS File, 364/131, 133, 136, 515, 704, 513; 340/146.2, 146.3 MA, 146.3 H, 146.3 R, 146.3 Q; 179/1 SB, 1 SD

[56] References Cited

U.S. PATENT DOCUMENTS

| | | | |
|---|---|---|---|
| 3,864,518 | 2/1975 | Kalfaian | 179/1 SA |
| 4,049,913 | 9/1977 | Sakoe | 179/1 SD |
| 4,059,725 | 11/1977 | Sakoe | 179/1 SD |
| 4,086,567 | 4/1978 | Crane et al. | 340/146.3 SY |
| 4,181,821 | 1/1980 | Pirz et al. | 179/1 SD |
| 4,210,962 | 7/1980 | Marsh et al. | 364/900 |
| 4,215,401 | 7/1980 | Holsztynski et al. | 340/146.3 MA |
| 4,224,600 | 9/1980 | Sellner | 340/146.3 MA |
| 4,256,924 | 3/1981 | Sakoe | 179/1 SD |
| 4,319,221 | 3/1982 | Sakoe | 340/146.3 Q |
| 4,349,700 | 9/1982 | Pirz et al. | 179/1 SD |

OTHER PUBLICATIONS

Sakoe, "Two—Level DP—Matching—A Dynamic Programming—Based Pattern Matching Algorithm", *IEEE Trans. on Acoustics, Speech and Signal Processing*, vol. ASSP—27, No. 6, Dec. 1979, pp. 588-595.

Guibas et al., "Direct VLSI Implementation of Combinatorial Algorithms" *Proceedings of the Caltech Conference on VLSI*, Jan. 1979, pp. 509-525.

Nakano et al., "Improvement of Chinese Char. Rec. using Projection Profiles," *Proc. 1st Int. Joint Conf. on Pattern Rec.*, 1973, pp. 172-178.

Dowling et al., "Elastic Template Matching in Speech Rec., using Linguistic Information," *Proc. 2nd Int. Joint Conf. on Pattern Rec.*, 1974, pp.249-250.

Sakoe et al., "Dynamic Programming Algorithm Optimization for Spoken Word Rec.," *IEEE Trans. on Acoustics, Speech, and Signal Processing*, vol. ASSP—26, No. 1, Feb. 1978, pp. 43-49.

Rabiner, et al., "Considerations in Dynamic Time Warping Algorithms for Discrete Word Rec.", *IEEE Trans. on Acoustics, Speech and Signal Processing*, vol. ASSP—26, No. 6, Dec. 1978, pp. 575-582.

*Primary Examiner*—Leo H. Boudreau
*Attorney, Agent, or Firm*—Richard J. Roddy

[57] ABSTRACT

Known signal processors for matching signal patterns commonly compare an unknown signal with one of a set of reference signals. Various comparison techniques are known. One comparison technique for solving a parenthesization problem includes an orthogonal array of interconnected cells which are adapted for dynamic programming and for extending data and control information in a generally left-to-right direction as well as in a bottom-to-top direction. For solving a pattern matching problem, known arrangements for extending control information in a generally left-to-right or bottom-to-top direction do not appear to be satisfactory. The disclosed signal processor for matching signal patterns and for dynamically time warping an unknown input signal with a reference input signal generates a measure of the correspondence between the input signals. In generating the correspondence measure, the processor includes an arrangement for controlling all processor cells on a predetermined diagonal of the array of cells. Thereby all cells coupled to the diagonal can operate in parallel to increase and improve the efficiency of the signal processor. The processor also includes an arrangement for controlling all processor cells on each diagonal of the array of cells. As a result, not only can all cells on each diagonal operate in parallel but also each of the plurality of diagonals can operate in parallel for processing the same or different sets of input signals. Thereby, a still further increase in the efficiency of the signal processor obtains.

10 Claims, 3 Drawing Figures

TIME WARP SIGNAL RECOGNITION PROCESSOR FOR MATCHING SIGNAL PATTERNS

TECHNICAL FIELD

This invention relates to signal processors and, more particularly, to a signal processor for dynamically time warping and for matching signal patterns.

BACKGROUND OF THE INVENTION

Signal processors for matching signal patterns such as speech signal patterns or visual signal patterns are known. For example, U.S. Pat. No. 4,181,821, issued Jan. 1, 1980 entitled "Multiple Template Speech Recognition System," discloses a processor for matching, or recognizing, an unknown speech signal as one of a set of reference signals. In many known speech recognition systems, an input utterance is analyzed to provide a set of feature signals which characterize the utterance. Such feature signals may typically be derived from spectral analysis or linear prediction analysis of the utterance. Initially, the recognition system apparatus is trained through the use of input utterances of identified reference words. Each input utterance of a known, identified word is analyzed to provide a set of reference feature signals, which reference signals are stored. Subsequent to the storage of a set of reference signals for each reference word to be recognized by the system, an unknown utterance is analyzed and a set of feature signals representative of the unknown utterance is obtained. The unknown utterance feature signals are compared with the sets of stored reference feature signals to determine the degree of dissimilarity or similarity therebetween. After the comparisons are completed, the unknown utterance is identified as the reference word whose feature signals most closely correspond to the feature signals of the unknown utterance.

As to a signal comparison technique, dynamic programming is a technique which is known for solving various optimization problems. Illustratively, dynamic programming can be used for dynamically time warping, e.g., one signal may be non-linearly stretched or compressed in either time or space to optimally match another signal. See, for example, L. R. Rabiner et al, "Considerations in Dynamic Time Warping Algorithms for Discrete Word Recognition," *IEEE Transactions on Acoustics, Speech and Signal Processing,* Vol. ASSP-26, No. 6, (December 1978), pp. 575–582, which discloses the use of dynamic time warping for comparing signals in a time domain signal recognition arrangement. Also see, for example, Y. Nakano et al, "Improvement of Chinese Character Recognition Using Projection Profiles," *Proceedings of the First International Joint Conference on Pattern Recognition,* (Oct. 30–Nov. 1, 1973), pp. 172–178, which discloses the use of dynamic time warping for comparing signals in a space domain signal recognition arrangement.

Special purpose signal processors, which have an architecture for allowing more efficient solution of dynamic programming problems through the use of parallel processing, are also known. For example, the publication by L. J. Guibas, et al, "Direct VLSI Implementation of Combinatorial Algorithms", *Proceedings of the CalTech Conference on Very Large Scale Integration,* (January 1979) pp. 509–525 discloses an architecture for solving a class of dynamic programming problems, which class may be characterized as the class of parenthesization problems. The Guibas signal processor includes a rectangular array of processor cells. Each cell is connected only to its nearest neighboring cells (i.e., to its nearest upward cell and to its nearest rightward cell). Also, each cell is structurally identical to each and every other cell. Too, data and control information are communicated between neighboring cells in a regular fashion. More particularly, dynamic programming data are synchronously extended in a left-to-right as well as in a bottom-to-top direction by means of two virtual data channels called respectively the fast belt and the slow belt. In addition to so extending data, control information is also extended in a generally left-to-right and bottom-to-top direction by means of a virtual control channel. The two data channels and the control channel share, in time, a single, i.e., actual, communication line which interconnects the neighboring cells. Thereby each of the actual (versus virtual) interprocessor communication lines passes two data signals and one control information signal per unit time.

This known combination of data and control information flow, jointly with the rectangular array of processor cells and a specially designed processor cell, comprises a structure capable of efficiently solving that class of dynamic programming problems characterized as the class of parenthesization problems. Unfortunately, in a diffferent class of dynamic programming problems, e.g., dynamic time warping problems, which class may be characterized as the class of pattern matching problems such as may occur in a speech signal or visual signal recognition system, the aforedescribed known structure does not appear to be satisfactory.

SUMMARY OF THE INVENTION

This and other problems are solved in accord with the principles of our invention by a signal processor for time warping and for matching signal patterns. Our improved signal processor includes an arrangement for dynamically time warping an unknown input signal with respect to a reference input signal or vice versa. The processor by extending data and control information according to a predetermined sequence of steps generates a measure of the dissimilarity or similarity between the input signals. In generating the measure, the instant processor, responsive to data as detected in an orthogonal network and responsive to the sequence of control information steps as detected on a diagonal control arrangement, permits the parallel processing of the input signals by a plurality of processor cells, the plurality of cells being individually responsive to control signals extended on the respective one or more control diagonals.

BRIEF DESCRIPTION OF THE DRAWING

Our invention should become apparent when taken in conjunction with the detailed description and the accompanying drawing, in which.

DETAILED DESCRIPTION

Figure 1:
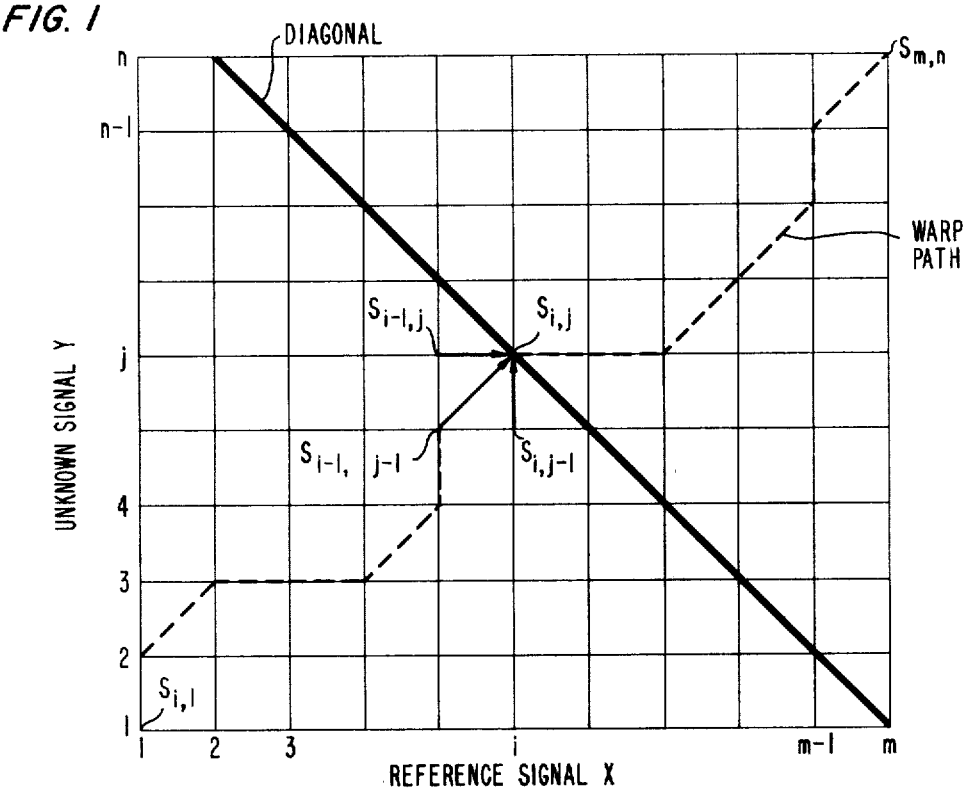
FIG. 1 illustrates an orthogonal grid which is useful in describing dynamic time warping.

FIG. 1 depicts an orthogonal grid which is useful in describing our dynamic time warping arrangement. Broadly, in dynamic time warping, a first signal may be non-linearly stretched with respect to a second signal for minimizing an overall optimization measure. More particularly, FIG. 1 contemplates a reference signal vector X and an unknown signal vector Y having respectively m and n elements, the elements respectively along orthogonal i and j axes. A warp path, depicted in FIG. 1 as a dashed line, associates one or more elements of reference signal X with each element of unknown signal Y, thereby defining the manner in which unknown signal Y may be stretched, i.e., time warped, to match reference signal X or vice versa. Each element of unknown signal Y may be compared with each element of stored reference signal X to determine the degree of correspondence therebetween. In evaluating the correspondence, an optimization, or distance, measure $D_{i,j}$ which measures the dissimilarity or similarity between an element of unknown signal Y and an element of reference signal X may be generated for each pair of data elements $(x_i, y_j)$, which are the input signal elements at each FIG. 1 grid intersection point (i,j). The distance measures may be algebraically summed over all pairs of data elements included on the warp path to generate an overall distance measure $S_{m,n}$, which overall measure describes the total distance between the two signals. Firstly, in so doing, the optimal warp path may be defined to be that warp path which obtains the closest correspondence between unknown signal Y and reference signal X, e.g. the warp path having the smallest overall distance measure. Secondly, the optimal overall distance may be defined to be the overall distance measure which is associated with the optimal warp path. Thirdly, the unknown utterance may be identified as the reference word whose feature signals most closely correspond, e.g. have the smallest optimal overall distance, to the feature signals of the unknown utterance.

Although various optimization measures are possible, in the instant description of an illustrative embodiment of the principles of our invention, we employ a measure of the Euclidean distance between elements of the two vectors. Therefore, along the horizontal i-axis, we contemplate a reference signal X including m elements, each element characterized by its own feature signal vector. In parallel fashion, along the vertical j-axis, we contemplate an unknown signal Y including n elements, each element characterized by its own feature signal vector. At each grid intersection point (i,j) in FIG. 1, there is a possible match between one element of the reference signal X and one element of the unknown signal Y. Thusly, for each such intersection point (i,j), distance measure $D_{i,j}$ for measuring the dissimilarity or the similarity between the two elements is determined as a function of the two feature vectors. For example, with $x_i$ as the i-th element of X and $y_j$ as the j-th element of Y, then $D_{i,j} = |x_i - y_j|$, or stated in words $D_{i,j}$ equals the magnitude, or algebraical absolute value, of the difference between the $x_i$ and $y_j$ elements.

Unknown signal Y may be matched to reference signal X by finding a monotonically increasing warp path extending from grid point (1,1) to grid point (m,n) whereby an optimal warp path, such as illustrated by the dashed line in FIG. 1, is formed. The optimal overall distance may then be generated as the weighted sum of the distance measures associated with all grid points which lie on the optimal warp path. Toward that end, it is known from dynamic programming theory that, if a point (i,j) lies on an optimal path, then the subpath from (1,1) to (i,j) is locally optimal. Hence, the minimal distance from (1,1) to (m,n) may be recursively obtained by finding locally optimal paths from a first intersection point through intermediate points to a second intersection point.

Although various recursive relationships for finding the optimal warp path are possible, a general class of such relationships may be characterized by the following:

$$S_{i,j} = \min[W_{p,q} \times D_{i,j} + S_{p,q}] \quad (1)$$

where:
$1 \leq p \leq i$
$1 \leq q \leq j$
$(p,q) \neq (i,j)$ and where $S_{i,j}$ is the partial sum of the distances on the optimal path from point (1,1) to point (i,j) and where $W_{p,q}$ is a weighting factor which may be a function of the position of point (p,q) relative to point (i,j) and which operates as a means for constraining the optimal path. Also various boundary conditions may be used to initialize recursive relationship (1). For example, partial sums $S_{0,0}$; $S_{1,1}$; $S_{0,j}$ where $j = 1, \ldots, m$; and $S_{i,0}$ where $i = 1, \ldots, n$ may be prefixed values. Thusly, stated in words, partial sum $S_{i,j}$ equals the minimum of a set of weighted sums formed by adding partial sum $S_{p,q}$ corresponding to grid point (p,q), point (p,q) being not above and being not to the right of grid point (i,j), to distance measure $D_{i,j}$ after $D_{i,j}$ is weighted through multiplication by a factor $W_{p,q}$.

In the instance description of an illustrative embodiment of the principles of our invention, we employ the following subset of recursive relationship (1) for finding the optimal warp path:

$$S_{i,j} = \min[D_{i,j} + S_{i-1,j}; 2 \times D_{i,j} + S_{i-1,j-1}; D_{i,j} + S_{i,j-1}] \quad (2)$$

where:
$S_{0,j} = \infty \qquad j = 1, \ldots, n$
$S_{i,0} = \infty \qquad i = 1, \ldots, m$
$S_{0,0} = 0$ As an aside, it is clear that the predetermined grid points which surround point (i,j) together with weighted recursive relation (2) form a constraint as to which paths are possible warp paths. For varied reasons, path constraints other than those formed by either recursive relation (1) or recursive relation (2) may be employed. For example, H. Sakoe and S. Chiba, in "Dynamic Programming Algorithm Optimization for Spoken Word Recognition", *IEEE Transactions on Acoustics, Speech, and Signal Processing,* Vol. ASSP-26, No. 1 (February 1978) pp. 43–49, disclose alternative constraints. Here the path constraint formed by recursive relation (2) is employed in connection with the instant description of an illustrative embodiment of the principles of our invention by way of illustration and not by way of limitation. Continuing, partial sum $S_{m,n}$ is then a correspondence measure of the dissimilarity or the similarity of the two vectors over the optimal warp path according to recursive relation (2). As a result, the reference signal X having the smallest overall distance measure $S_{m,n}$ with respect to unknown signal Y can then be said to be the closest match to unknown signal Y.

Figure 2:
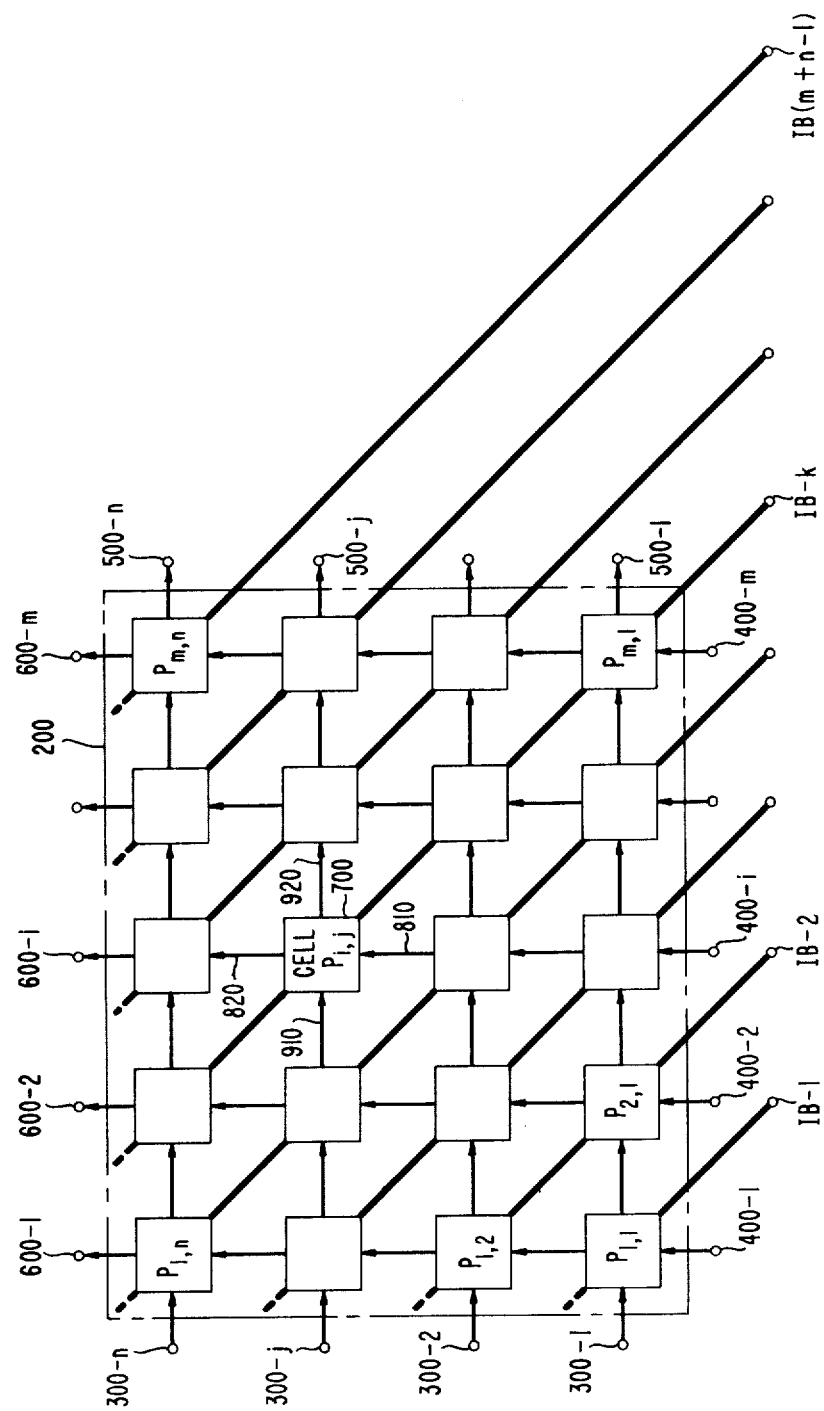
FIG. 2 illustrates a signal processor structure illustrative of a processor in accord with the principles of our invention.

FIG. 2 illustrates signal processor 200 for dynamically time warping and for matching signal patterns in accord with the principles of our invention, e.g., by diagonally controlling the matching of unknown signal Y and reference signal X. Broadly, each of the m×n processor cells $P_{i,j}$ is adapted for operation at a respective one of grid intersection points (i,j). Also, each cell may be substantially identical to every other cell. As an aside, it is worthy to note that our array of processor cells need not include a rectangular array of exactly m×n cells. In an alternative embodiment, predetermined ones of the cells, e.g., cells on or near the perimeter of the array, may be omitted consistent with any path limitations imposed by the employed path constraint. For example, predetermined cells, which neighbor upper left corner cell $P_{1,n}$ and lower right corner cell $P_{m,1}$ and which generate data that do not contribute substantially to the optimal overall distance may be omitted. In either event, we now describe the operation of our illustrative processor 200.

Firstly, for dealing with data, our processor 200 includes a plurality of vertical data cables, such as cables 810 and 820, and a plurality of horizontal data cables, such as cables 910 and 920. The vertical data cables are for extending data from a first bottom processor cell to a second top cell, the second cell usually being immediately atop the first cell, e.g. data may be extended from processor cell $P_{i,j}$ to cell $P_{i,j+1}$ by way of cable 820. The horizontal data cables are for extending data from a first left processor cell to a second right cell, the second cell usually being immediately to the right of the first cell, e.g., data may be extended from processor cell $P_{i,j}$ to cell $P_{i+1,j}$ by way of cable 920. It may be noted from recursive relations (1) and (2) that partial sum $S_{i,j}$ is a function of distance measure $D_{i,j}$ as well as a function of partial sums below and to the left of processor cell $P_{i,j}$. Distance measure $D_{i,j}$ is in turn a function of input signal elements $x_i$ and $y_j$. Thusly, element $x_i$ of reference signal X may be extended from input terminal 400-i to cell $P_{i,1}$, while element $y_j$ of unknown signal Y may be extended from input terminal 300-j to cell $P_{1,j}$. Thereafter, element $x_i$ of reference signal X is extended from bottom-to-top over the appropriate vertical data cables (e.g., from processor $P_{i,j}$ upward either to processor $P_{i,j+1}$ or to output terminal 600-i) while element $y_j$ of unknown signal Y is extended from left-to-right over the appropriate horizontal data cables (e.g., from processor $P_{i,j}$ rightward either to processor $P_{i+1,j}$ or to output terminal 500-j). Data such as partial sum $S_{i,j}$ may be extended from processor cell $P_{i,j}$ to all processors above and to the right via these same vertical and horizontal data cables, e.g., processor cell 700 may extend its partial sum along with any partial sum received from a processor cell below or to the left of cell 700 to all processor cells above and to the right of cell 700 via cables 820 and 920. It is thus clear that this arrangement of vertical and horizontal data cables may be used to transmit signal element data and partial sum data from any processor cell $P_{p,q}$ to processor cell $P_{i,j}$ where $p \leq i$ and $q \leq j$ thereby satisfying the path constraint data requirements dictated by either relation (1) or relation (2).

Secondly, for dealing with control information, our improved processor includes a plurality of diagonal control arrangements, e.g., instruction buses IB-k, which are shown as approximately of negative unit slope with respect to the horizontal i-axis. That is, diagonal processors $P_{i,j}$ and $P_{i+1,j-1}$ are on the same predetermined control instruction bus. As a result, each processor, which is coupled to the predetermined diagonal, can concurrently have available the same control information. It may be noted from recursive relations (1) and (2) that partial sum $S_{i,j}$ is a function of partial sums generated below and to the left of processor cell $P_{i,j}$ but is independent of partial sums generated above and to the right of cell $P_{i,j}$. As a result, processor cell $P_{i,j}$ would not usually generate a partial sum $S_{i,j}$ until all processors below and to the left of cell $P_{i,j}$ had generated their respective partial sums. More particularly, processor cell $P_{i,j}$ when connected to control instruction bus IB-k would not usually generate its partial sum $S_{i,j}$ until all processor cells on instruction bus IB-(k−1) had generated their respective partial sums.

Control information may be extended along control instruction bus IB-k, responsive to which each processing cell $P_{i,j}$ connected to bus IB-k would generate its respective partial sum $S_{i,j}$ based on input signal data and partial sum data, which data had priorly been generated by cells below and to the left of processing cell $P_{i,j}$ and which data may be extended to cell $P_{i,j}$ via cells such as cells $P_{i-1,j}$ and $P_{i,j-1}$ connected to control instruction bus IB-(k−1). Thereafter, responsive to control information extended along control instruction bus IB-(k+1) and responsive to data transmitted from cells below and to the left, processing cells connected to bus IB-(k+1) generate their respective partial sums. Thereby, all processors on the diagonal can operate in parallel for generating their respective partial sums. Thusly, the illustrative embodiment of FIG. 2 may introduce enormous processing efficiency.

Thirdly, it should be clear that, when a processing step of a cell on diagonal IB-k is complete, the input signal data and the partial sum data used and/or generated during the processing step may be transmitted to the cells on diagonal IB-(k+1) for processing thereby. As a result, processor cells on adjacent diagonals may concurrently perform different steps of the processing, e.g., cells on diagonal IB-(k+1) may generate a distance measure while cells on diagonal IB-k, having previously generated their respective distance measures, generate partial sums. Furthermore, when all processing steps on diagonal IB-k are complete and all data used and/or generated during those processing steps has been transmitted to diagonal IB-(k+1), the processing cells on diagonal IB-k would be immediately available for processing still other data. Thus adjacent diagonals may also concurrently process different unknown signals and different reference signals. Hence not only do the principles of our invention give advantages as to the parallel processing of all cells on a specific diagonal but the principles of our invention also give advantages as to the parallel processing of different sets of input signals on different diagonals. As a result, up to (m+n−1) pairs of input signals may be processed in parallel by our signal processor 200. Further, generation of the overall distance measure for one reference signal X and one unknown signal Y is complete when all (m+n−1) diagonals, beginning with diagonal IB-1 and ending with diagonal IB-(m+n−1), have performed their respective processing. Thus, the diagonal parallel processing may proceed in a wave-like manner across the (m+n−1) diagonals in such a way that all processor cells in signal processor 200 may operate in parallel. As a result, the illustrative embodiment of FIG. 2 may introduce enormous processing efficiency. For example, assume the processing of either recursive relation requires T seconds on a conventional sequential signal processor. Without the advantages of our invention, optimal overall distance $S_{m,n}$ would likely require about the product of $m \times n \times T$ processing seconds. On the other hand, with the advantages of our invention, assuming that the processing of the recursive relation is partitioned into $N_D$ steps, each step requiring $T_2$ seconds, and assuming that the $N_D$ steps execute in parallel on $N_D$ adjacent diagonals, then our signal processor 200 will begin processing a new set of input signal patterns every $N_D \times T_2$ seconds. Thus, a new optimal overall distance will be generated by processor $P_{m,n}$ every $N_D \times T_2$ seconds, this time being independent of the size of the array, i.e., independent of m and n.

Fourthly, for explaining the operation of our illustrative signal processor 200, we use a specific four processor step example.

During a first processor step, assume processor cell $P_{1,1}$ has extended thereto reference element $x_1$ from input terminal 400-1 and unknown element $y_1$ from input terminal 300-1. Responsive to a first "execute" instruction extended from terminal IB-1 over diagonal instruction bus 1, processor cell $P_{1,1}$ generates Euclidean distance $D_{1,1}$.

During a second processor step, reference element $x_1$ may be extended upward from processor cell $P_{1,1}$ to processor cell $P_{1,2}$ while unknown element $y_1$ may be extended rightward from processor cell $P_{1,1}$ to processor cell $P_{2,1}$. Concurrently, reference element $x_2$ may be extended from input terminal 400-2 to processor cell $P_{2,1}$ while unknown element $y_2$ may be extended from input terminal 300-2 to processor cell $P_{1,2}$. Responsive to a second execute instruction extended from terminal IB-2 over diagonal instruction bus IB-2, diagonal processor cells $P_{1,2}$ and $P_{2,1}$ generate in parallel, their respective Euclidean distance measures $D_{1,2}$ and $D_{2,1}$.

During a third processor step, reference element $x_1$ and $x_2$ may be extended upward and in parallel from respective processor cells $P_{1,2}$ and $P_{2,1}$ to respective processor cells $P_{1,3}$ and $P_{2,2}$ on diagonal bus IB-3. Concurrently, unknown elements $y_1$ and $y_2$ may be extended rightward and in parallel from processor cells $P_{2,1}$ and $P_{1,2}$ to respective processor cells $P_{3,1}$ and $P_{2,2}$ on diagonal bus IB-3. Also concurrently, reference element $x_3$ may be extended from input terminal 400-3 to processor cell $P_{3,1}$ while unknown element $y_3$ may be extended from input terminal 300-3 to processor cell $P_{1,3}$. Responsive to a third execute instruction extended from terminal IB-3 over diagonal instruction bus IB-3, diagonal processor cells $P_{1,3}$; $P_{2,2}$ and $P_{3,1}$ generate in parallel, their respective Euclidean distance measures $D_{1,3}$; $D_{2,2}$ and $D_{3,1}$.

During a fourth processor step, reference elements $x_1$, $x_2$ and $x_3$ may be extended upward and in parallel from respective processor cells $P_{1,3}$; $P_{2,2}$ and $P_{3,1}$ to respective processor cells $P_{1,4}$; $P_{2,3}$ and $P_{3,2}$ on diagonal IB-4. Concurrently, unknown elements $y_1$, $y_2$ and $y_3$ may be extended rightward and in parallel from respective processor cells $P_{3,1}$; $P_{2,2}$ and $P_{1,3}$ to respective processor cells $P_{4,1}$; $P_{3,2}$ and $P_{2,3}$ on diagonal bus IB-4. Also concurrently, reference element $x_4$ may be extended from input terminal 400-4 to processor cell $P_{4,1}$ while unknown element $y_4$ may be extended from input terminal 300-4 to processor cell $P_{1,4}$. Responsive to a fourth execute instruction extended from terminal IB-4 over diagonal instruction bus IB-4, processor cells $P_{1,4}$; $P_{2,3}$; $P_{3,2}$ and $P_{4,1}$ generate in parallel their respective Euclidean distance measures $D_{1,4}$; $D_{2,3}$; $D_{3,2}$ and $D_{4,1}$.

Although the description of the four processor step example emphasized the flow of input signal data, i.e., $x_i$ and $y_j$, as well as the flow of control information, it should be clear from recursive relations (1) and (2) that partial sum data also flows through processor 200. In the interest of brevity, we save a description of the flow of partial sum data until later. Whenever described, it should be clear that, when the processing on diagonal IB-k is complete, input signal data and partial sum data used and/or generated during the processing on diagonal IB-k may be transmitted to the cells on diagonal IB-(k+1) for processing thereby. When the data are so transmitted, the cells on diagonal IB-k are immediately free for processing another set of input signals.

Fortuitously, the principles of our invention give rise to an advantage in that processor cells on different respective diagonals may be processing different respective sets of reference-unknown input signals. For example, up to (m+n−1) pairs of input signals may be processed in parallel by our signal processor 200. Also, the principles of our invention give rise to an advantage in that all processor cells on each respective diagonal instruction bus IB-k, in response to execute instructions extended from terminal IB-k, may operate in parallel. As a result, the diagonal parallel processing may proceed in a wave-like manner across the (m+n−1) diagonals. Thusly, in light of the above, responsive to a set of execute instructions extended sequentially to diagonal instruction buses IB-1 through IB-(m+n−1), processor 200 operates in parallel to sequentially extend the respective optimal overall distance measures for several pairs of reference-unknown signal patterns from an output of processor cell $P_{m,n}$ to output terminal 500-n. As an aside, we described the sequential extension and execution of execute instructions to diagonal buses IB-1 through IB-(m+n−1). Indeed, in alternative embodiments, execute instructions may be extended concurrently to all or prefixed subsets of the diagonal buses. Thus our illustrative embodiment is by way of example, and not by way of limitation to, the principles of our invention. Continuing, later and after the sets of reference-unknown signal comparisons are completed, the unknown utterance may be identified as the reference word whose feature signals most closely correspond to the feature signals of the unknown utterance, e.g., has the smallest $S_{m,n}$.

Turning now to the individual processor cells, each processor cell $P_{i,j}$ such as cell 700 may be a general purpose processor, for example, a microprocessor with associated read only memory for storing instructions, or a special purpose processor, for example, a specifically designed processor for providing the relatively simple computations suggested by recursive relations (1) or (2). An added advantage of a special purpose processor cell obtains from the usually fewer number of components and hence, the usually smaller and less costly apparatus and hence, the possibility for integrating several such cells on a single chip using very large scale integration (VLSI) techniques. Still another advantage of a special purpose processor is that its architecture can be specially designed to solve a class of problems more efficiently. Whichever cell design is used, the following description is intended to exemplify the internal operation of the cell.

Figure 3:
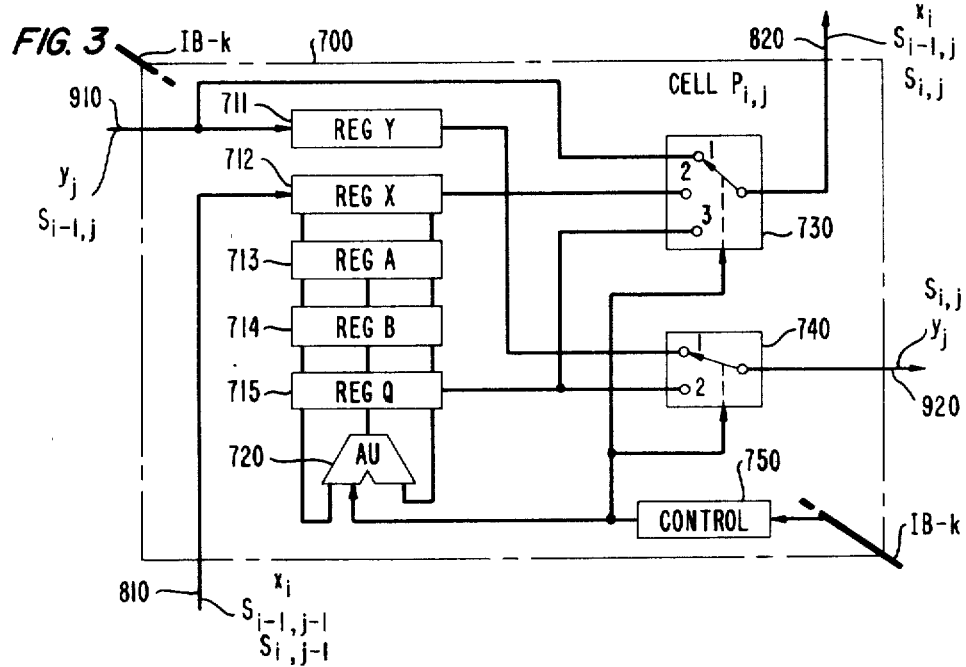
FIG. 3 illustrates a processor cell useful in describing the illustrative embodiment of FIG. 2.

Refer now to FIG. 3, which schematically illustrates a functional processor cell $P_{i,j}$. Also, in the following description we assume a path constraint formed by recursive relation (2).

During a first stage of processor $P_{i,j}$'s operation, an unknown signal element $y_j$ is extended either from input terminal 300-j or from processor cell $P_{i-1,j}$ over cable 910 to Y register 711 while a corresponding reference signal element $x_i$ is extended either from input terminal 400-i or from processor $P_{i,j-1}$ over cable 810 to an input of X register 712. As will shortly be made clear, while Y register 711 is receiving $y_j$, Q register 715 is transmitting a priorly generated partial sum $S_{i,j}$. Continuing, under control of control unit 750, which also controls switches 730 and 740 as well as arithmetic unit 720, and responsive to an execute instruction detected on instruction bus IB-k, the two elements are subtracted from each other during this first stage of processor $P_{i,j}$'s operation and the magnitude of the difference is then stored in Q register 715 for generating the Euclidean distance $D_{i,j}$. It was this first stage which was emphasized in our earlier description of the specific four processor step example. The following emphasizes still other stages.

During a second stage of processor $P_{i,j}$'s operation, partial sum $S_{i-1,j-1}$ from the cell below and to the left, i.e., from cell $P_{i-1,j-1}$, is extended via processor $P_{i,j-1}$ over cable 810 to X register 712. Concurrently, unknown signal element $y_j$ previously stored in Y register 711 is extended through position 1 of switch 740 thence over cable 920 to rightward cell $P_{i+1,j}$. Also concurrently, reference signal element $x_i$ previously stored in X register 712 is extended through position 2 of switch 730 over cable 820 to upward cell $P_{i,j+1}$. Still concurrently, distance measure $D_{i,j}$ which was stored in Q register 715 during the first stage, is algebraically added to itself thereby forming $2 \times D_{i,j}$, this $2 \times D_{i,j}$ datum being stored in A register 713. The datum stored in A register 713 is thereafter algebraically added to partial sum $S_{i-1,j-1}$, which had been stored in X register 712, thereby generating $(2 \times D_{i,j}) + S_{i-1,j-1}$, this datum being stored in A register 713.

Nextly, during a third stage of processor $P_{i,j}$'s operation, partial sum $S_{i-1,j}$ from leftward cell $P_{i-1,j}$ is extended over cable 910 to Y register 711 and also through position 1 of switch 730 over cable 820 to upward processor $P_{i,j+1}$. Concurrently, partial sum $S_{i,j-1}$ from bottom cell $P_{i,j-1}$ is extended over cable 810 to X register 712. Nextly, under control of control unit 750 and arithmetic unit 720, the minimum of $S_{i-1,j}$ previously stored in Y register 711 and $S_{i,j-1}$ previously stored in X register 712 is formed, this result being stored in B register 714. The minimum stored in B register 714 is subsequently algebraically added to $D_{i,j}$ previously stored in Q register 715 thereby generating $D_{i,j}$ plus the minimum as between $S_{i-1,j}$ and $S_{i,j-1}$, this result being stored in B register 714. Thereafter, under control of control unit 750 and arithmetic unit 720, the minimum of the intermediate results previously stored in A register 713 and B register 714 is generated, the generated minimum being stored in Q register 715 as partial sum $S_{i,j}$ according to recursive relation (2).

Finally, during a fourth stage of processor $P_{i,j}$'s operation, the partial sum $S_{i,j}$ is extended from Q register 715 through position 2 of switch 740 over cable 920 to processor cell $P_{i+1,j}$. Concurrently partial sum $S_{i,j}$ is extended from Q register 715 through position 3 of switch 730 over cable 820 upward to processor cell $P_{i,j+1}$.

As priorly mentioned, it should be clear that certain of the four described stages can occur concurrently. For example, as input signal elements $x_i$ and $y_j$ of one reference-unknown signal pair are being received by processor $P_{i,j}$, the contents of Q register 715 may be transmitted over cable 920 to the right, i.e., transmitted either to processor $P_{i+1,j}$ or to output terminal 500-j as partial sum $S_{i,j}$ of a previous reference-unknown signal pair. Concurrently, partial sum $S_{i,j}$ may be transmitted over cable 820 upward, i.e., transmitted either to processor $P_{i,j+1}$ or to output terminal 600-i. By so overlapping functions of a processor $P_{i,j}$ still further efficiencies are obtained from our improved signal processor 200.

Although our invention has been described and illustrated in detail with respect to signal processor 200, it is to be understood that same is by way of example and is not by way of limitation. For example, as priorly mentioned, path constraints other than those set forth in recursive relations (1) or (2) could work equally well in the practice of the principles of our invention. Further, although disclosed relative to a processor for solving problems in the time domain, the principles of our invention apply equally to a processor for solving problems in the space domain. Still further, although we described a sequential extension (or execution) of execute instructions to diagonal buses, the principles of our invention apply equally to a processor including concurrent extension (or execution) of some or all execute instructions to the diagonal buses. Accordingly, the scope and spirit of our invention is limited only by the terms of the appended claims.

What is claimed is:

1. A method for matching signals, said method including the step of
    extending an unknown input signal and a reference input signal through an orthogonal array of processor cells and characterized in that said method further comprises the steps of:
    time warping one input signal with respect to the other input signal;
    processing said wrapped input signals in processor cells, said cells being coupled to a predetermined diagonal of said array;
    controlling said processing by having all cells coupled to said diagonal of said array concurrently processing said input signals; and
    generating during said processing a measure of the correspondence between said input signals.

2. The method for matching signals defined in claim 1 further comprises the steps of:
    controlling the parallel processing of each of a plurality of respective diagonals of said array whereby said respective diagonals concurrently process respective input signals.

3. In a signal recognition system, a signal processor including an array of cells, said cells adapted for processing an input signal according to a predetermined criteria and characterized in that said signal processor further comprises
    (a) means for time warping an unknown input signal and a reference input signal,
    (b) means responsive to said warped signals for generating a measure of the correspondence between said input signals, said generating means including means for controlling the parallel processing of a plurality cells, said plurality of cells being coupled to a predetermined diagonal of said array of cells, and
    (c) means for extending said correspondence measure to an output terminal.

4. The signal processor defined in claim 3 wherein said parallel processing control means further includes (d) means for controlling the parallel processing of cells on a plurality of respective predetermined diagonals of said array of cells.

5. A signal processor including an array of processor cells, means for extending an input signal through said cells to an output terminal and characterized in that said signal processor further comprises pattern matching means, said pattern matching means including:
(a) first means for comparing a first unknown input signal and a first reference input signal,
(b) first means for time warping either of said first input signals with respect to the other of said first input signals, and
(c) diagonal control means coupled to said first time warping means for controlling cells on a first predetermined diagonal of said array of cells, said diagonal controlling means including means for the parallel processing of said signals to be compared.

6. The signal processor defined in claim 5 wherein said pattern matching means further includes:
means for providing an optimal time warp path through said array of processor cells.

7. The signal processor defined in claim 5 wherein said pattern matching means further includes:
means responsive to said diagonal control means for measuring a correspondence between said input signals and
means for extending said correspondence measure to an output terminal.

8. The signal processor defined in claim 6 wherein said pattern matching means further includes:
means responsive to said diagonal control means for measuring a correspondence between said input signals and
means for extending said correspondence measure to an output terminal.

9. The signal processor defined in claim 5 wherein said pattern matching means further includes:
(d) second means for comparing a second unknown input signal and a second reference input signal,
(e) second means for time warping either of said second input signals with respect to the other of said second input signals,
(f) said diagonal control means coupled to said second time warping means for controlling cells on a second predetermined diagonal of said array of cells.

10. The signal processor defined in claim 9 wherein said diagonal control means further includes:
(g) means for parallel processing such that not only do all cells on said first diagonal parallel process said first input signals to be compared and all cells on said second diagonal parallel process said second input signals to be compared but also said first diagonal processing occurs substantially concurrent and in parallel with said second diagonal processing.

* * * * *